(No Model.)
L. T. FOREMAN.
SWINGING HOSE BRACKET.
No. 566,853. Patented Sept. 1, 1896.
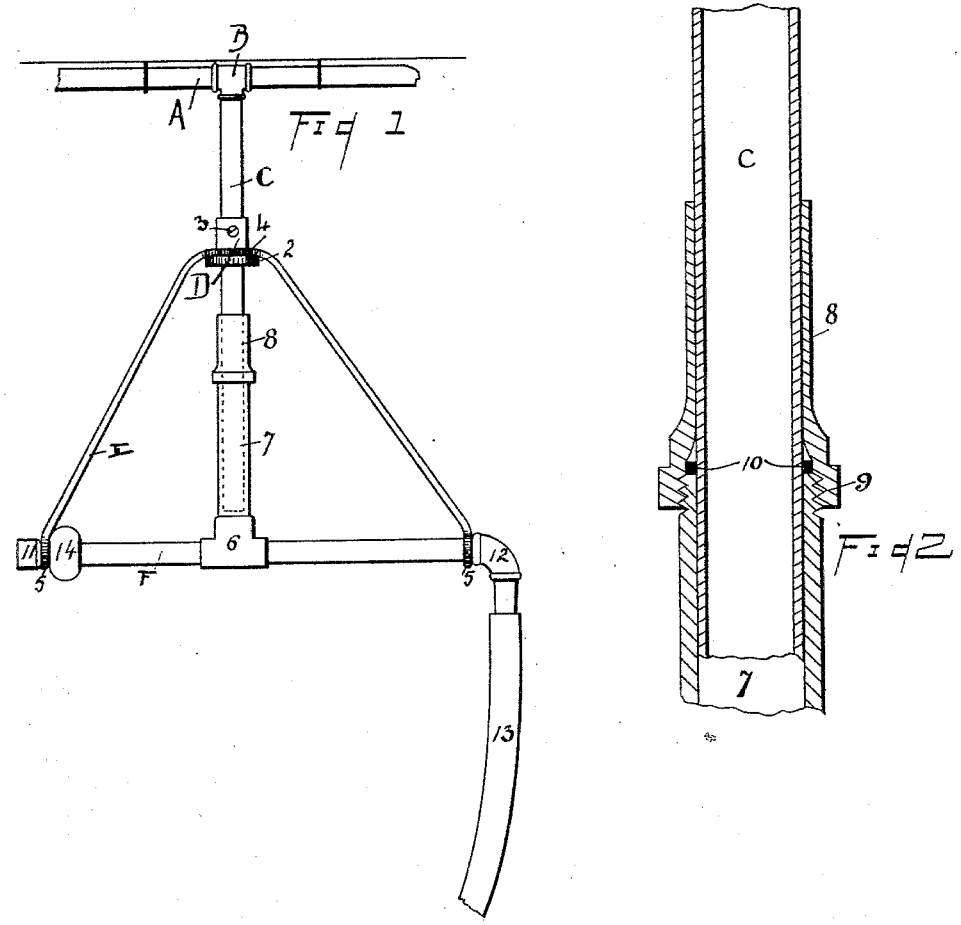
WITNESSES:
D. C. Miller
A. Wilson.
Lewis T. Foreman
INVENTOR
BY  C. W. Snee.
ATTORNEY.

UNITED STATES PATENT OFFICE.

LEWIS T. FOREMAN, OF OMAHA, NEBRASKA.

SWINGING HOSE-BRACKET.

SPECIFICATION forming part of Letters Patent No. 566,853, dated September 1, 1896.

Application filed September 30, 1895. Serial No. 564,249. (No model.)

*To all whom it may concern:*

Be it known that I, LEWIS T. FOREMAN, of Omaha, in the county of Douglas and State of Nebraska, have invented certain useful Improvements in Swinging Hose-Brackets; and I do hereby declare that the following is a full, clear, and exact description of the invention, such as will enable others skilled in the art to which it appertains to make and use the same, reference being had to the accompanying drawings, which form a part of this specification.

This invention has relation to a new and novel swinging hose-bracket.

In the accompanying drawings, Figure 1 shows my invention as attached to an ordinary ceiling, while Fig. 2 shows an enlarged detail of the connecting-joint.

The object of my invention is to provide a simple device that shall be more particularly adapted to be used in carriage-houses and livery-stables, where vehicles are usually cleaned.

A represents an ordinary water-service pipe which is provided with a suitable T, B. Extending from this T is the main supply-pipe C, which is preferably polished upon the outside and is provided with the adjustable collar D, which works thereon and is provided with the extending flange 2 and a set-screw 3. Working upon the flange 2 of the collar D is an ordinary hanger E, which is provided with the central ring 4 and annulets 5. This hanger E is revolubly supported upon the collar D, and in turn gives a movable support to the supply-pipe F. This pipe F connects by means of a T 6 with the telescoping tube 7. At its upper end this tube 7 is provided with a water-tight connection 8. This connection 8 screws upon the pipe 7, as may be noticed in referring to Fig. 2, by means of the thread 9, to further insure a water-tight joint and provide the connection 8 with the packing-collar 10, which collar rides snugly between the tube C and the connection 8, as may be noticed in Fig. 2. The supply-pipe F is provided at one end with the closing-cap 11 and at the other with the nozzled elbow 12, connecting with the hose 13. To insure nice adjustment of the bracket, I have provided the tube F with the counterpoise 14, secured at the end opposite the hose 13.

Now the operation of this device is very simple. As the hose is used, it can be readily swung in a circle by the main supply-tube C by virtue of the telescoping pipe 6, which nicely contains this main supply-pipe C. The bracket E also readily swings by the stationary collar D, and the hose 13 may further be adjusted vertically by means of the collar D, which can be loosened and carried either upward or downward, so that the pipe C is either carried inward or out of the telescoping tube 7. In Fig. 1 I have shown this tube C in dotted lines within the tube 7.

The device is noticeable because of its extreme simplicity; and,

Having thus described my certain invention, what I claim as new, and desire to secure by United States Letters Patent, is—

1. In a swinging hose-bracket the combination with a main supply-pipe of an adjustable flanged collar upon said pipe, a bracket movably depending and working from and upon said collar, a sliding tube encompassing said main supply-tube, supported at its end within said swinging bracket, and a hose secured to said encompassing tube, all substantially as and for the purpose set forth.

2. In a swinging hose-bracket the combination with the main supply-pipe provided with a flanged adjustable supporting-collar and bracket movably held upon said collar and tube adjustable upon said main supply-pipe and working within said bracket, said flanged collar being in combination with a suitable hose, all substantially as and for the purpose set forth.

3. In a swinging hose-bracket the combination with the supply-pipe, C, of the adjustable collar, D, the bracket E, the pipe, F, supported by means of said bracket and provided with the telescoping tube, 7, the connection, 8, securing said tube, 7, to the tube, 6, the packing-ring, 10, working between said connection, 8, and tube, C, in combination with the counterpoise, 14, and hose, 13, all substantially as and for the purpose set forth.

In testimony whereof I affix my signature in presence of two witnesses.

LEWIS T. FOREMAN.

Witnesses:
GUSTAVE ANDERSON,
C. P. HOLLIGON.